US010211638B2

(12) United States Patent
Do Rosario et al.

(10) Patent No.: US 10,211,638 B2
(45) Date of Patent: Feb. 19, 2019

(54) POWER QUALITY OF SERVICE OPTIMIZATION FOR MICROGRIDS

(71) Applicants: Jackseario Antonio Dionisio Do Rosario, Austin, TX (US); Brian Kelley, Austin, TX (US)

(72) Inventors: Jackseario Antonio Dionisio Do Rosario, Austin, TX (US); Brian Kelley, Austin, TX (US)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 341 days.

(21) Appl. No.: 15/025,294

(22) PCT Filed: Sep. 30, 2014

(86) PCT No.: PCT/US2014/058299
§ 371 (c)(1),
(2) Date: Mar. 28, 2016

(87) PCT Pub. No.: WO2015/048737
PCT Pub. Date: Apr. 2, 2015

(65) Prior Publication Data
US 2016/0233682 A1    Aug. 11, 2016

Related U.S. Application Data

(60) Provisional application No. 61/884,252, filed on Sep. 30, 2013.

(51) Int. Cl.
H02J 3/38      (2006.01)
G06Q 10/06   (2012.01)
(Continued)

(52) U.S. Cl.
CPC ........ *H02J 3/383* (2013.01); *G06Q 10/06315* (2013.01); *G06Q 50/06* (2013.01);
(Continued)

(58) Field of Classification Search
CPC ............. H02J 3/383; H02J 3/386; H02J 3/387
(Continued)

(56) References Cited

U.S. PATENT DOCUMENTS

2006/0208574 A1   9/2006 Lasseter et al.
2008/0046387 A1   2/2008 Gopal et al.
(Continued)

FOREIGN PATENT DOCUMENTS

EP        2144346       1/2010

OTHER PUBLICATIONS

PCT Patent Application PCT/US2014/058299 filed Sep. 30, 2014, International Search Report and Written Opinion dated Jan. 4, 2015.
(Continued)

*Primary Examiner* — Thomas Skibinski
(74) *Attorney, Agent, or Firm* — Thomas | Horstemeyer, LLP

(57) ABSTRACT

Various examples are provided for power quality of service optimization for microgrids. In one example, among others, a microgrid includes a smart meter configured to control supply of electric power to loads based at least in part upon energy consumption scheduling of the loads, which is based at least in part upon an effective electric generation capacity associated with the microgrid. The energy consumption scheduling can be based at least in part upon estimated power output of a sustainable energy resource of the microgrid and a load demand characterization of the loads. In another example, a system comprises a plurality of microgrids and an advanced metering infrastructure (AMI) configured to monitor operations of the microgrids and to
(Continued)

control supply of electric power from sustainable energy resources and energy storage systems to loads of the microgrids via smart meters based at least in part upon energy consumption scheduling of the loads.

25 Claims, 7 Drawing Sheets

(51) Int. Cl.
G06Q 50/06 (2012.01)
H02J 3/00 (2006.01)

(52) U.S. Cl.
CPC .............. *H02J 3/386* (2013.01); *H02J 3/387* (2013.01); *H02J 2003/003* (2013.01); *H02J 2003/007* (2013.01); *Y02B 90/244* (2013.01); *Y02B 90/248* (2013.01); *Y02E 10/563* (2013.01); *Y02E 60/76* (2013.01); *Y04S 10/54* (2013.01); *Y04S 20/327* (2013.01); *Y04S 20/52* (2013.01); *Y04S 40/22* (2013.01)

(58) Field of Classification Search
USPC ............................ 307/26; 700/291, 292, 297
See application file for complete search history.

(56) References Cited

U.S. PATENT DOCUMENTS

| | | | |
|---|---|---|---|
| 2010/0179704 A1* | 7/2010 | Ozog | G06Q 10/06315 700/291 |
| 2012/0143385 A1* | 6/2012 | Goldsmith | H02J 3/38 700/297 |
| 2012/0271470 A1 | 10/2012 | Flynn et al. | |
| 2013/0079938 A1 | 3/2013 | Lee et al. | |
| 2013/0082529 A1 | 4/2013 | Wolter | |

OTHER PUBLICATIONS

Tan et al. Coordinated Control and Energy Management of Distributed Generation Inverters in a Microgrid. IEEE Transactions on Power Delivery, vol. 28, No. 2, Apr. 2013 (pp. 704-713 [retrieved on Nov. 30, 2014).
U. Bossel, "On the Way to a Sustainable Energy Future," Telecommunications Conference, 2005. INTELEC '05. Twenty-Seventh International , vol., no., pp. 659-668, Sep. 2005.
S. Chowdhury, Microgrids and Active Distribution Networks. London, United Kingdom: IET, 321 pages, 2009.
J. Widén, "Distributed Photovoltaics in the Swedish Energy System." Licentiate of Technology Thesis, Fac. Sci. and Tech., Uppsala Univ., Uppsala, Sweden, pp. 1-87, 2009.
L. Joerissen ,J. Garche, Ch. Fabjan , G. Tomazic, "Possible use of vanadium redox-flow batteries for energy storage in small grids and stand-alone photovoltaic systems", Journal of Power Sources, vol. 127. pp. 98-104, Mar. 2004.
C. Bennett and D.Highfill, "Networking AMI Smart Meters," Energy 2030 Conference, 2008. Energy 2008. IEEE , vol., no., pp. 1,8, Nov. 17-18, 2008.
J. Davies and D. Mackey, "Evaluation of selected models for estimating solar radiation on horizontal surfaces". Solar Energy, vol. 43, No. 3. pp. 153-168, 1989.
C. Gueymard. "Prediction and performance assessment of mean hourly solar radiation." Solar Energy, vol. 68, No. 3, pp. 285-303, 2000.
E. Kaplani, and S. Kaplanis, "Prediction of Solar Radiation Intensity for Cost-Effective PV Sizing and Intelligent Energy Buildings," in Solar Power.Intech, 21 pages, 2012.
E. Kaplani and S. Kaplanis,. "A model to predict expected mean and stochastic hourly global solar radiation I values." Renewable Energy, vol. 32, No. 8, pp. 1414-1425, Jul. 2007.

J. Polo et al. "A simple approach to the synthetic generation of solar irradiance time series with high temporal resolution." Solar Energy, vol. 85, No. 5, pp. 1164-1170, May 2011.
J. Huang et al. "Forecasting solar radiation on an hourly time scale using a Coupled AutoRegressive and Dynamical System (CARDS) model." Solar Energy, vol. 87, pp. 136-139, 2013.
M. Ahmad and G. Tiwa, "Study of models for predicting the mean hourly global radiation from daily summations," Open Environmental Science, 2, pp. 6-14, 2008.
G. Masters, Renewable and Efficient Electric Power Systems. New Jersey: Wiley, pp. 1-654, 2004.
Stand-Alone Photovoltaic System, Sandia Nat. Lab. Albuquerque, NM, SAND87-7023, 437 pages, Jul. 2003.
National Renewable Energy Laboratory. http://www.nrel.gov, 3 pages.
G. Walker. "Evaluating MPPT converter topologies using a MATLAB PV model," Journal of Electrical and Electronics Engineering, vol. 21, No. 1, pp. 49-56, 2001.
J. Gow and C. Manning. "Development of a Photovoltaic Array Model for Use in Power-Electronics Simulation Studies." IEE Proceedings of Electric Power Applications, vol. 146, No. 2, pp. 193-200, Mar. 1999.
C. Blanc, "Modeling of a Vanadium Redox Flow Battery Electricity Storage System." Ph.D. dissertation. EPFL, Lausanne, Switzerland, pp. 1-264, 2009.
Vanadium Redox Flow Batteries: An In-Depth Analysis. EPRI, Palo Alto, CA: 1014836, 102 pages, 2007.
T. Sukkar and M. Skyllas-Kazacos, "Modification of membranes using polyelectrolytes to improve water transfer properties in the vanadium redox battery," Journal of Membrane Science, vol. 222, No. 1-2, pp. 249-264, Sep. 2003.
Low Weight, Low Cost Commercial-Scale PV Inverter. www.IdealPowerConverters.com, ISBN 978-1-4398-7138-6 vol. 3, pp. 754-757, 2011.
I. Richardson, "Integrated high-resolution modelling of domestic electricity demand and low voltage electricity distribution networks." Ph.D. dissertation, Dept. E.E. Eng, Loughborough Univ., Leicestershire, United Kingdom, 221 pages, 2010.
J. Widén et al, "Constructing load profiles for household electricity and hot water from timeuse data—Modelling approach and validation." Energy and Buildings, vol. 41, No. 7, pp. 753-768, Jul. 2009.
J. Widén et al, "A combined Markovchain and bottom-up approach to modelling of domestic lighting demand." Energy and Buildings, vol. 41, No. 10, pp. 1001-1012, Oct. 2009.
J. Widén and E. Wäckelgård, A high-resolution stochastic model of domestic activity patterns and electricity demand. Applied Energy, vol. 87, No. 6, pp. 1880-1892, Jun. 2010.
S. Kaplanis "Design and Determination of the Most Cost Effective PV Configuration Systems to Meet the Loads of a Household." Product Engineering, Talaba, D., Thomas R., Springer, Netherlands, pp. 473-508, 2005.
T. Khatib et al, "A new approach for optimal sizing of standalone photovoltaic systems," International Journal of Photoenergy, vol. 2012, Article ID 391213, 7 pages, 2012.
K. Wang et al, "A Stochastic Power Network Calculus for Integrating Renewable Energy Sources into the Power Grid," Selected Areas in Communications, IEEE Journal on , vol. 30, No. 6, pp. 1037-1048, Jul. 2012.
J.H. Lucio et al, "Loss-of-load probability model for stand-alone photovoltaic systems in Europe," Solar Energy, vol. 86, No. 9, pp. 2515-2535, Sep. 2012.
Y. Ru et al, "Storage Size Determination for Grid-Connected Photovoltaic Systems," Sustainable Energy, IEEE Transactions on , vol. 4, No. 1, pp. 68-81, Jan. 2013.
T. Khatib, "A review of designing, installing and evaluating standalone photovoltaic power systems," Journal of Applied Sciences, vol. 10, No. 13, pp. 1212-1228, 2010.
G.B. Shrestha and L. Goel, "A study on optimal sizing of stand-alone photovoltaic stations," Energy Conversion, IEEE Transcations on , vol. 13, No. 4, pp. 373-378, Dec. 1998.
G. Klise and J. Stein, "Models Used to Assess the Performance of Photovoltaic Systems," Sandia Nat. Lab. Albuquerque, NM, Rep. SAND2009-8258, pp. 1-61, Dec. 2009.

(56) References Cited

OTHER PUBLICATIONS

D. Wu, "Providing Quality-of-Service Guarantees in Wireless Networks," Ph.D. dissertation, Dept. Elect. Eng and Comp. Eng., Carnegie Mellon Univ., Pittsburgh, PA, pp. 1-288, 2003.
A.H Mohsenian-Rad et al, "Optimal and autonomous incentive-based energy consumption scheduling algorithm for smart grid," Innovative Smart Grid Technologies (ISGT), 2010, vol., no., pp. 1,6, Jan. 19-21, 2010.
I. Koutsopoulos and L. Tassiulas, "Optimal Control Policies for Power Demand Scheduling in the Smart Grid," Selected Areas in Communications, IEEE Journal on , vol. 30, No. 6, pp. 1049-1060, Jul. 2012.
P. Samadi et al, "Optimal Real-Time Pricing Algorithm Based on Utility Maximization for Smart Grid," Smart Grid Communications (SmartGridComm), 2010 First IEEE International Conference on , vol., no., pp. 415-420, Oct. 2010.
D. Zhu, "Reliability-Aware Dynamic Energy Management in Dependable Embedded Real-Time Systems," Real-Time and Embedded Technology and Applications Symposium, 2006. Proceedings of the 12th IEEE , vol., no., pp. 397-407, Apr. 2006.
Information technology—Open Systems Interconnection—Basic Reference Model: The Basic Model. ISO/IEC 7498-1: pp. 1-59, 1994.
R. Miller, The OSI Model: An Overview. Available: http://www.sans.org/reading_room/whitepapers/standards/osi-model-overview_543, 10 pages, 2001.
L. Li et al, "A Stable Vanadium Redox-Flow Battery with High Energy Density for Large-Scale Energy Storage." Advanced Energy Materials, vol. 1, No. 3, pp. 394-400, May 2011.
G. L. Choudhury et al, "Squeezing the most out of ATM," IEEE Transactions on Communications, vol. 44, No. 2, pp. 203-217, Feb. 1996.

\* cited by examiner

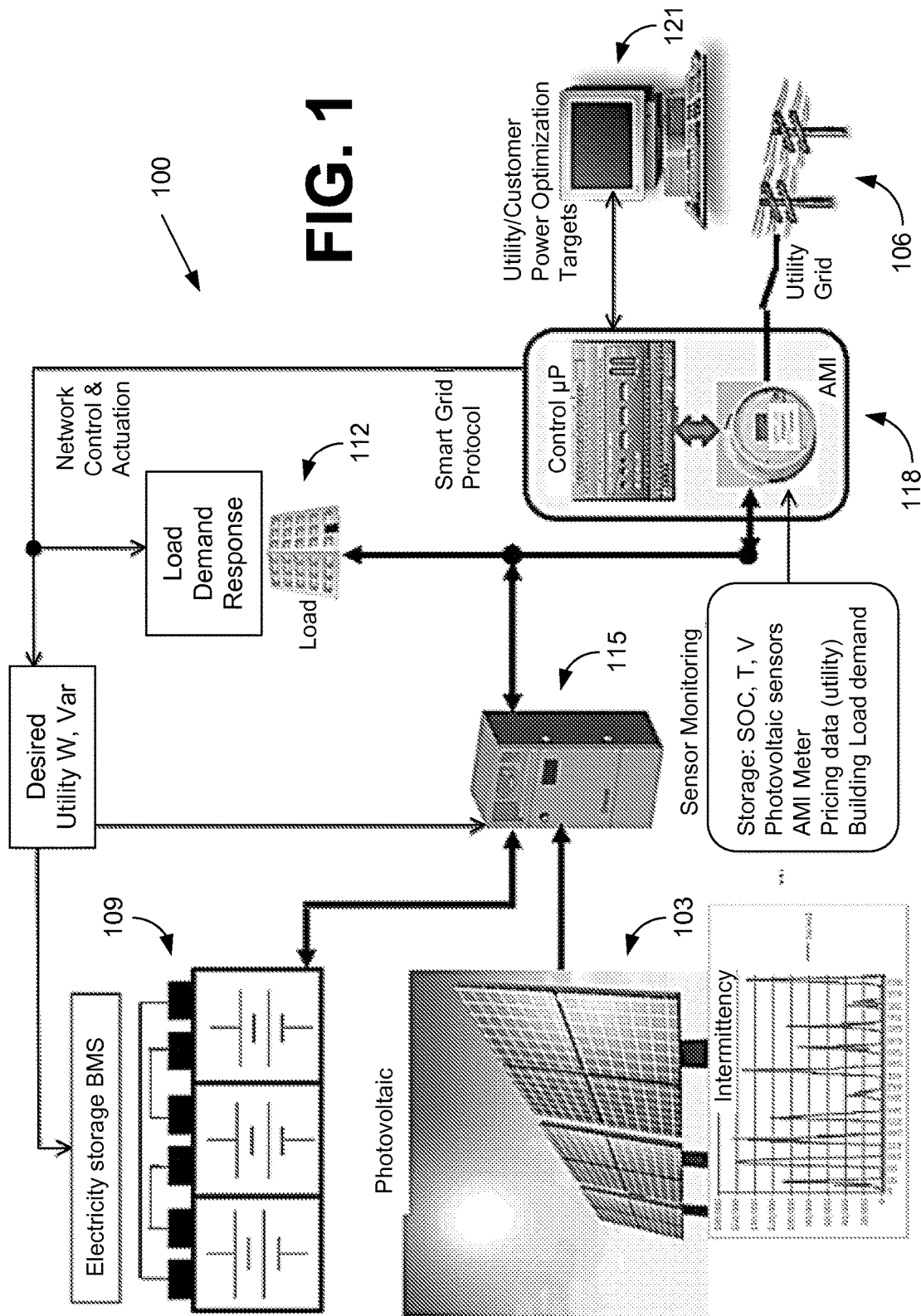

POWER QUALITY OF SERVICE OPTIMIZATION FOR MICROGRIDS

CROSS-REFERENCE TO RELATED APPLICATIONS

This application is the 35 U.S.C. 0.5371 national stage of, and claims priority to and the benefit of, PCT application PCT/US2014/058299, filed Sep. 30, 2014, which claims priority to, and the benefit of, co-pending U.S. provisional application entitled "Quality of Service Electric Generation Capacity and Stochastic Optimization Theory for Microgrids Utilizing Photovoltaic Sources" having Ser. No. 61/884,252, filed Sep. 30, 2013, both of which are hereby incorporated by reference in their entirety.

STATEMENT REGARDING FEDERALLY SPONSORED RESEARCH OR DEVELOPMENT

This invention was made with government support under agreement RE-AG1-2010 awarded by the Department of Energy. The Government has certain rights in the invention.

BACKGROUND

The pursuit of a sustainable energy future is a mankind long dream. For most of the twenty-first century, energy sustainability has become a pressing matter. Politicians, scientists and engineers have looked for energy resources that meet two main sustainable energy criteria: the harvest, as well as the release, of reaction products causes little or no damage to the environment, and nature can replenish itself between two harvesting periods. The energy resources that account for most of the energy used today, such as fossil fuels, do not pass the sustainable energy criteria. They are quickly being depleted from use, while increasing the environmental pollution.

Hence, sustainable energy resources that will not diminish over time, and whose availability will not depend on price or market fluctuations, are being investigated. In the last decade, the use of such renewable resources has increased. As an example, from 2000 to 2007, the photovoltaic (PV) power production increased from 1000 MW to almost 8000 MW in countries belonging to the International Energy Agency—Photovoltaic Power System (IEA-PVPS). The use of sustainable energy resources is changing the way the electric grid network is operated and designed.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 1 is a graphical representation of an example of a microgrid in accordance with various embodiments of the present disclosure.

DETAILED DESCRIPTION

Figure 2A:
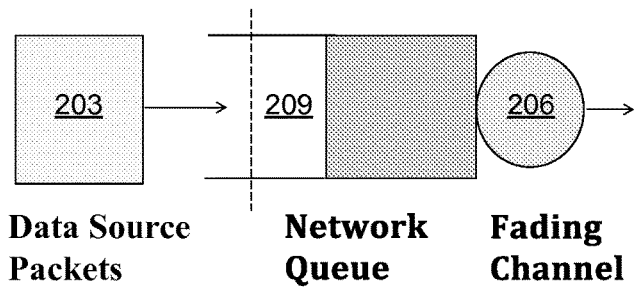
FIGS. 2A and 2B are graphical representations of examples of a quality of service (QoS) queuing model and a power quality of service (PQoS) model, respectively, in accordance with various embodiments of the present disclosure.

Disclosed herein are various examples related to a quality of service electric generation capacity and stochastic optimization theory for microgrids, which can utilize photovoltaic or other renewable sources. Reference will now be made in detail to the description of the embodiments as illustrated in the drawings, wherein like reference numbers indicate like parts throughout the several views.

The electric grid network has come a long way from the Edison Electric Light Company with localized networks close to end-users, to the more deregulated large power station with long distance transmission lines. Now with the advances in power electronics, where direct current electricity is not a detriment, the electric grid network is changing from a passive distribution network, where power flows in one direction, to a more active distribution network, where power flows in multiple directions with the integration of the sustainable energy resource. The advances in the electric grid network have made it less vulnerable to perturbations. Today, an electric grid network can be monitored using sophisticated power-flow control equipment. However, malfunction are still occur in the electric grid network, as was evidenced by the 2003 blackout that affected parts of northeast United State and Canada. To reduce the risk of malfunction, new concepts were investigated and introduced to reduce the stressing imposed to network. The concept of the microgrid was developed to solve some of these problems.

A microgrid can be defined as a low and medium voltage integrated energy system comprising interconnected loads and distributed generation units, including sustainable energy resources, which can operate in two main modes: (1) grid connected mode, and (2) islanded mode. In the grid connected mode, the microgrid remains totally or partially connected to the electric grid network (e.g., a utility grid or distribution network) and imports and/or exports power from and/or to the electric grid network, respectively. However, when the electric grid network is down, or is disconnected by operator discretion, the microgrid can switch to the islanded mode, where the microgrid operates as an independent entity and generates and supplies its own power. Distributed power can be locally generated power at distribution (low and medium) voltage levels that is integrated into the utility distribution network. Distributed power sources can include, but are not limited to, power generation involving wind, solar photovoltaic (PV), biogas, natural gas, fuel cells, and/or micro-turbines, which contrast with traditional centralized power generation on the electric grid network.

Microgrids are often located at the very end of the major electricity distribution networks, close to the end-user, to provide benefits to the electric grid network such as improving the grid energy efficiency, power quality and reliability to end-users. Microgrids also have the potential to decrease the peak demand of the electric grid network since the end-user can use the localized generated power. However, to provide reliable and quality power, microgrids can use mechanisms to regulate voltage and frequency in response to changes in end-user loads and system disturbances. The energy demanded by the load can be matched with the energy supplied by the sustainable sources. Sustainable energy resources introduce challenging hurdles for power grid networks. Their intermittency and randomness can make it difficult to match the energy supplied by sustainable sources to the energy demanded by the load. Loads can produce variability as well.

Referring to FIG. 1, shown is an example of a microgrid 100. The modern architecture of the microgrid 100 includes sustainable energy resources 103 such as, e.g., photovoltaics and/or wind turbines. Sustainable energy resources 103, such as wind and solar energy, are by nature characteristically fluctuating and intermittent when supplying power to microgrids. For example, the availability of solar energy depends upon time of the day, climate change and location. These random occurrences can cause microgrids 100 to disrupt the functionality of the electric grid network (or utility grid) 106 causing voltage rise, and power degradation, when operating in a grid connected mode, as well as the loss-of-load when operating in an islanded mode.

To provide reliability to end-users, microgrid designers utilize an in-depth knowledge of all components that form the microgrids 100, which can include sustainable energy source(s) 103, electricity (or energy) storage 109, and load(s) 112 that can be interconnected through one or more control, conversion and/or distribution units such as a power conditioning unit 115. An advanced metering infrastructure (AMI) 118 can be used to monitor and/or control overall operation of the microgrid 100. There are several models that can be used to assess the performance of a microgrid 100. Most of the models aim to provide mechanisms that facilitate the design of the components of the microgrid 100 so certain availability of power can be expected throughout the year. Availability of power can be defined as the frequency of time (or percentage of time) that the microgrid 100 will satisfy the load demand over a certain period. However, these models do not implement mechanisms to actually guarantee that the power available through the design will be provided during continuous operation of the microgrid 100. Microgrids 100 can be interconnected and/or connected to a utility grid 106, which allows for power to be provided between microgrids 100 to satisfy load demands. Successful deployment of sustainable energy microgrids 100 depends upon how efficiently the distributed power sources can provide a guarantee of continuous availability of power to satisfy the load demand. This motivates a need for dispatchable power production with a specified power quality of service (PQoS).

The energy storage system 109 is important to the electric grid networks since it can be used as a fail-safe to supply power to end-users. In microgrids 100, a reliable and inexpensive energy storage is beneficial since the output of renewable energy resources such as solar or wind are characteristically unstable. The use of energy storage 109 for load leveling, peak shaving during dynamic operation of the microgrids 100, and providing frequency regulation and spinning reserve, can improve the utilization of generation, transmission, and distribution assets. The energy storage 109 should to be able to supply power to the load 112 at times where the sustainable energy resources 103 do not produce enough power to support the load demand. In some implementations, a centralized energy storage system can be included to supply electrical power to loads of interconnected microgrids 100. The centralized energy storage system can be charged using power from sustainable energy resources 103 from the microgrids 100 and/or from the utility grid 106.

It is advantageous for the energy storage 109 to have a good and long discharge rate, support the peak demanded power, be close to the load to minimize losses, have a long life cycle and be able to function well in extreme temperatures. Energy storage systems can be divided in three main categories: mechanical storage systems, electrical storage systems and electrochemical storage systems. Of the three, only electrochemical storage systems meet the above conditions. Of the electrochemical storage systems, the best one for microgrids is flow batteries; and in particular a vanadium redox flow battery (VRB). VRBs offer independence of energy and power ratings, high charge and discharge rates, a long lifespan independent of state of charge. VRBs also offer low maintenance requirements, a very high efficiency up to 90%, and a decreasing cost per kWh at higher storage capacity installations.

The power conditioning unit (or inverter) 115 is a fundamental component for any direct current (DC) renewable energy generation system. The selection of an inverter will depend upon the AC operating voltage or system voltage, and the DC output of the renewable energy generation system. Inverters are characterized by their continuous power handling capability, and the amount of surge power they can supply for brief periods of time. When no load is present, a good inverter will power down to less than 1 watt of standby power while it waits for something to be turned on. When it senses a load, the inverter powers up and while it runs uses on the order of 5-20 W of its own power. That means that standby losses associated with electronic devices (or loads) 112 supplied through the microgrid 100 may keep the inverter running continuously, even though no real energy service is being delivered. In that case, the inverter loss adds to the other standby losses decreasing the overall efficiency of the renewable energy generation system, which emphasizes the need for a manual shutdown to turned-off electronic equipment.

Predicting performance of the PV system is a matter of combining the characteristics of the PV array and the inverter with local insolation and temperature data. PV system models can be used to estimate the power output, as well as to evaluate the performance of the PV system by simulating its operation using appropriate models for the available insolation, the photovoltaic array, the load, and other components. Most PV system models use specific geographic location inputs, such as latitude, temperature, season, weather patterns, population demographics, etc. to accurately determine and generate a profile of how much solar irradiance is available for harvesting, what is the amount of load demanded, and how efficient is the power conversion of the photovoltaic system components. These PV models may be simple by using general assumptions about the system components or complex by taking into account manufacturer parameters, derived parameters, and historically derived data. The more inputs the models accept, the more complex they become, which can improve their ability to match the system load with expected power generation.

The criteria used for the evaluation of PV systems can include:
- Availability—which refers to the overall uptime of the system, the percentage of time in which the system will meet the demand over a certain period.
- Zero load rejection—investigates the fact that the desired photovoltaic system is always able to supply load without any cutoffs, 100% availability.
- Number of hours of storage—the hours of battery storage needed for a stand-alone system to meet the desired system availability. This parameter can be correlated with the storage capacity.
- The frequency of loss-of-load—the number of times the load gets interrupted in a specific period of time.
- The loss-of-load probability—the probability of failing to power the load. It can be estimated as the ratio of the energy not served by the 'original' system to the total demanded energy.
- Energy not utilized or energy loss/waste—the amount of energy that is wasted because of a mismatch between the photovoltaic system and the storage system.

Using the above criteria, the loss-of-load probability can be reduced by increasing the size of the photovoltaic array; however this may also increase the energy loss. Furthermore, the frequency of loss-of-load is highly dependent upon the insolation characteristics and the storage system capacity. As the capacity of the storage system increases, the energy loss and the frequency of loss-of-load will decrease due to the mitigation of the instantaneous variation of insolation by the storage system. So, the size of the photovoltaic array and the capacity of the storage system have different effects on the PV system performance indices.

The estimation of the energy demand of a microgrid 100 operating in an islanded mode will determine the size and cost of the photovoltaic system, as well as the amount of power that it needs to provide to meet the load demand. For simplicity the power demanded for all loads 112 of the microgrid 100 are keep constant during the entire operating cycle of the load 112. For individual microgrids 100, the energy demand can be the sum of the product of the nominal power rating of each load 112, multiplied by the hours that it will be in use. During the estimation process, it is not necessary to deterministically predict when the loads will be in use or for how long. The best approach is to create models that will output energy demand data that has the same statistical characteristics as that of the deterministic approach. These models are called, stochastic energy demand models. Stochastic demand models are models that use a set of probabilities that represent the likelihood of different loads being used at different times of the day.

There are two major approaches to create energy demand models: the top-down approach and the bottom-up approach. In the top-down approach, a set of aggregated consumption data from a network of microgrids can be broke down to emulate a single individual microgrid. In contrast, a bottom-up approach involves the use of the individual loads used within a microgrid, and building this up in order to determine the aggregated consumption data. Bottom-up models were of interest since they are concerned with the consumption of a microgrid in an individual load base.

Of the bottom-up models that can be used, a Richardson model has the advantage of including the concept of occupancy. Occupancy patterns and behavior can significantly affect the energy usage. The use of the occupancy concept helps to realistically represent the diversity in concurrent load use, since load concurrence will only occur when there is more than one end-user on the microgrid. Also, the amount of energy usage will not double if the number of end-user doubles; it will just be incrementally increased with the magnitude of the increment reduced for each additional end-user added. If occupancy is not taken into account, the usage time of some of the loads (e.g., loads that their use heavily depends upon the presence of end-users at the microgrid) may be spread throughout the entire day.

This disclosure presents mechanisms to design and operate microgrids 100 to provide a guarantee of continuous availability of power within a certain probability. While examples discuss microgrids 100 using solar energy as their sustainable energy resource 103 operating in the islanded mode, other forms of sustainable energy resources 103 can also be utilized. While the following discussion is focused on PV systems, it is equally applicable to other renewable energy generation systems. Providing reliability of service is an important factor of the electric grid network 106. The electric grid network 106 is designed to provide 100% availability of power; however for microgrids 100 using solar energy, where the power produced varies randomly with time, providing 100% availability of power would be unrealistic.

Existing models provide mechanisms that facilitate the design of the components of distributed generation networks to maintain an expected availability of power throughout the year. Availability of power, which can be defined as a probability metric over a suitable time window, indicates the frequency of time (or percentage of time) that a microgrid 100 will satisfy the demand of the load 112. However, these existing models do not provide mechanisms to guarantee that the design availability of power will be provided or that the periods of loss-of-load are minimized or nonexistent during continuous operation of the distributed generation network.

A power quality of service (PQoS) model can be utilized for renewable energy power plants, which includes real time, historical data, and longitude-latitude model data. The PQoS model is similar to a quality of service (QoS) queuing model utilized in queuing behavior analysis of wireless networks. In the wireless network context, QoS frameworks attempt to maintain link quality over random fading channels. In its native unimproved state, wireless channels have low reliability and time-varying capacities, which may cause severe QoS violations. Unlike wireline links which typically have a constant capacity, wireless channel capacity depends upon such random factors as multipath fading, co-channel interference, and noise disturbances. Consequently, providing QoS guarantees over wireless channels required accurate models of their time-varying capacity and effective utilization of these models for QoS support.

Packet switching networks utilize queuing analysis of the link to characterize the effect of the data traffic pattern, as well as the channel behavior performance of the communication system. FIG. 2A shows an example of a network QoS queuing model where the source traffic 203 and the network service 206 are matched using a first-in first-out (FIFO) buffer or queue 209. Thus, the FIFO queue 209 prevents loss of packets that could occur when the source rate is more than the service rate. This occurs at the expense of an increase in the delay of communications. When viewed in this fashion, the functionality of the FIFO queue 209 resembles the functionality of the electricity (or energy) storage 109 in the microgrid 100 of FIG. 1.

Figure 2B:
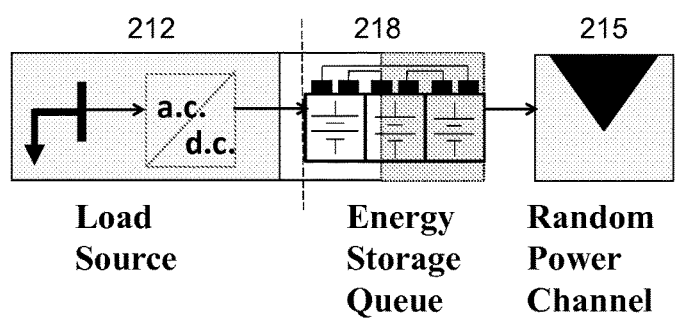

FIG. 2B illustrates an example of a power quality of service (PQoS) model. The PQoS model enables the design of availability of power provisioning mechanisms over random power sources and loads. In the example of FIG. 2B, the PQoS model with a load model 212 (e.g., appliances, inverters, etc.), a sustainable energy system 215 (e.g., photovoltaic (PV), wind or other renewable energy system and/or electric grid network), and energy storage system 218 can be considered as analogous to the communication network QoS queuing model of FIG. 2A with source traffic 203, network service 206 and a buffer 209. The source traffic 203 can be described as the load model 212; the network service 206 can be described as a PV system (or other sustainable energy system) 215, and the buffer 209 as the energy storage system 218. The arrows in FIG. 2B are reversed due to using the load-demand as a source perspective rather than power generation. Since queuing analysis uses traffic and service characterization, the PQoS model can utilize load and PV system characterization, which are analogous to the traffic and service characterization.

PQoS provisioning can be accomplished for renewable power plants (or sustainable energy resources) using the disclosed PQoS model, which can provide a guarantee of an availability of power with a specific probability. The framework adapts scheduling to shift the load demand and controlled power scheduling from energy storage, under the random fluctuations of power generation. When implemented, renewable or sustainable power sources can be optimized for availability of power guarantees on a yearly-period. A formal analytic framework is presented for real-time PQoS optimization.

When dealing with energy consumption management for microgrids, two major approaches can be used: reduction of consumption and shifting of consumption. The reduction of consumption can be accomplished without inconveniencing the end-user. In other words, the time of use of the load will not change. To do that, the loads can be disconnected from the microgrid when they are not being used. Loads may also be disconnected from a microgrid by a smart meter to avoid failure of the microgrid (e.g., to avoid overload of the sustainable energy resources 103 and/or energy storage system 109. The loads will not be on stand-by mode. The problem with the standby mode is that if a considerable amount of loads are in standby mode, they can keep the inverter running continuously, even though no real energy service is being delivered.

For the shifting of consumption approach, loads can be scheduled according to a pre-determined time frame. A basic approach can be to move loads with non-emergency (or non-critical) power demands to more subtle times. The time of use of the loads can be shifted with the aim of better matching load demand with power supply production by the sustainable energy resources. The time of operation of some loads may be shifted without inconveniencing the end-user. The end-user can specify the times at which the loads can be scheduled, and based on that information, with a proper scheduling algorithm, a shift of consumption can be achieved.

Figure 3A:
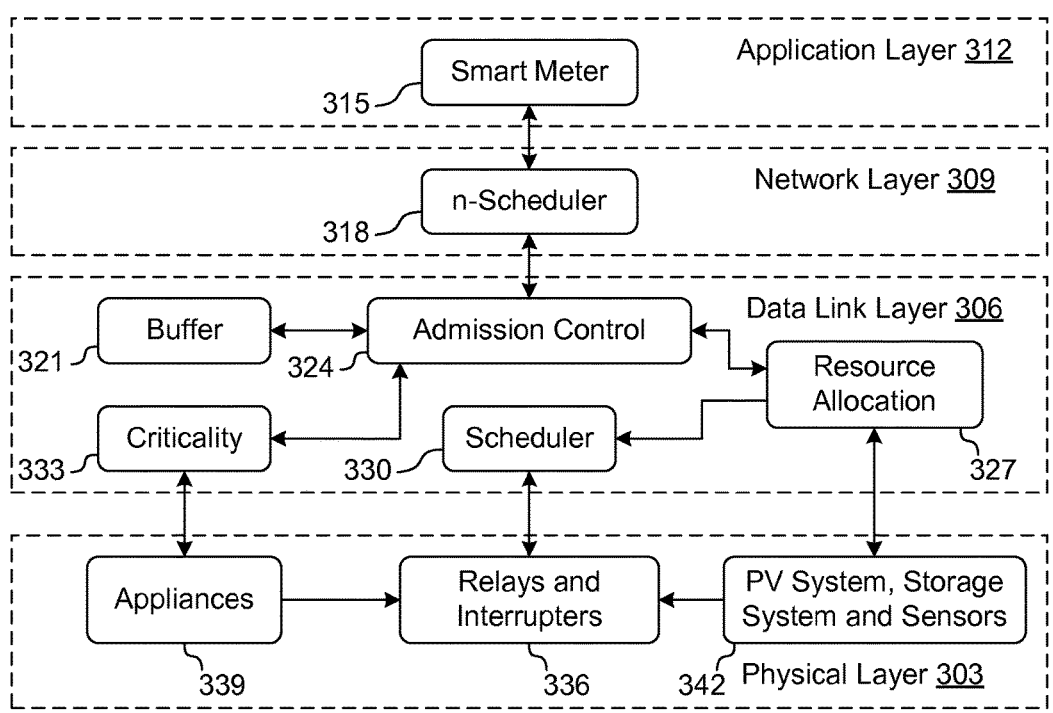
FIGS. 3A through 3C are graphical representations of an example of a network architecture for use with the microgrid of FIG. 1 in accordance with various embodiments of the present disclosure.

To provide quality of service guarantees for a microgrid, a power network architecture that resembles a computer network architecture can be used. Referring to FIG. 3A, shown is an example of a power network architecture including a physical layer 303, data link layer 306, network layer 309 and application layer 312. This format of the network architecture was chosen based on the microgrid 100 described on FIG. 1.

The application layer 312 is the highest layer of the network device architecture for power quality of service provisioning for microgrids 100 and provides the only means for the end-user to have access the networked services. This layer also provides services for network management. One of the components found at the application layer 312 is the advanced metering infrastructure (AMI) 118 (FIG. 1), which includes one or more smart meter(s) 315 for measurement, collection, analysis, and communication of information about the microgrid(s). The AMI can also include a centralized control system for coordination of multiple microgrids and/or the utility grid. Smart meters of different microgrids can communicate with each other and/or the centralized control system. This can facilitate cooperation between the different microgrids for scheduling power generation and/or supply to the loads of the microgrids. For example, creation of optimized energy consumption scheduling for various microgrids can be coordinated to benefit the overall system. The end-user inputs to, outputs from the network, and validates information for the management of the network at this layer 312. The end-user can input the information used for the management of the network via a smart meter 315. The information includes, but is not limited to, the power characteristics of the loads being used, the flexibility of time of use of the loads, the acceptable power quality of service (PQoS), and the agreements of the responsibility for loss-of-load. At this level, the end-user can validate the information from the network layer 309. For example, the end-user can accept a schedule proposed by the network layer 309.

Furthermore, the introduction of the advanced metering infrastructure (AMI) information networks enables information to be related to the electric grid network 106 (FIG. 1) in real-time. This information can include, but is not limited to, malfunction(s) on microgrid 100 and/or the electric grid network 106, end-users load demand, control information and commands. The AMI 118 has the potential to shut down parts of the electric grid network 106 for self-healing. This can be used internally at the microgrids 100 to shut down non-critical loads 112 to avoid loss-of-load events for the more critical loads 112. The AMI can enable the end-user to configure and/or overwrite the system.

The network layer 309 controls the operation of one or more microgrids with sustainable resource(s) that can share electric energy between each other. The network layer 309 can provide group optimization procedures, and loss-of-load control. Through the network layer 309 (e.g., n-scheduler 318), the microgrids and sustainable resources interact with each other by running a distributed algorithm to find the optimal energy consumption schedule for the overall system using the two major approaches discussed above: reduction of consumption and shifting of consumption. The optimization can be static or dynamic according to the current state of the network. The network layer 309 can allow heterogeneous networks (microgrids with different power generation resources) to be interconnected.

The data link layer 306 provides functional and procedural means for the establishment, maintenance and release of connections between the load 112 (FIG. 1) and the sustainable resource(s) 103 (FIG. 1) of the microgrid 100. The data link layer 306 also enables the network layer 309 to control the interconnection of the circuits within the physical layer 303. Data link connections can be established and released dynamically, and when a loss-of-load is detected a notification can be provided to the network layer 309. The data link layer 306 can deal with the PQoS control for the sustainable resources 103 based on information from the network layer 309 and information from the sensors in the physical layer 303. As shown in FIG. 3A, the data link layer 306 includes the following four components: buffer 321, admission control 324, resource reservation 327, and scheduler 330.

Figure 3B:
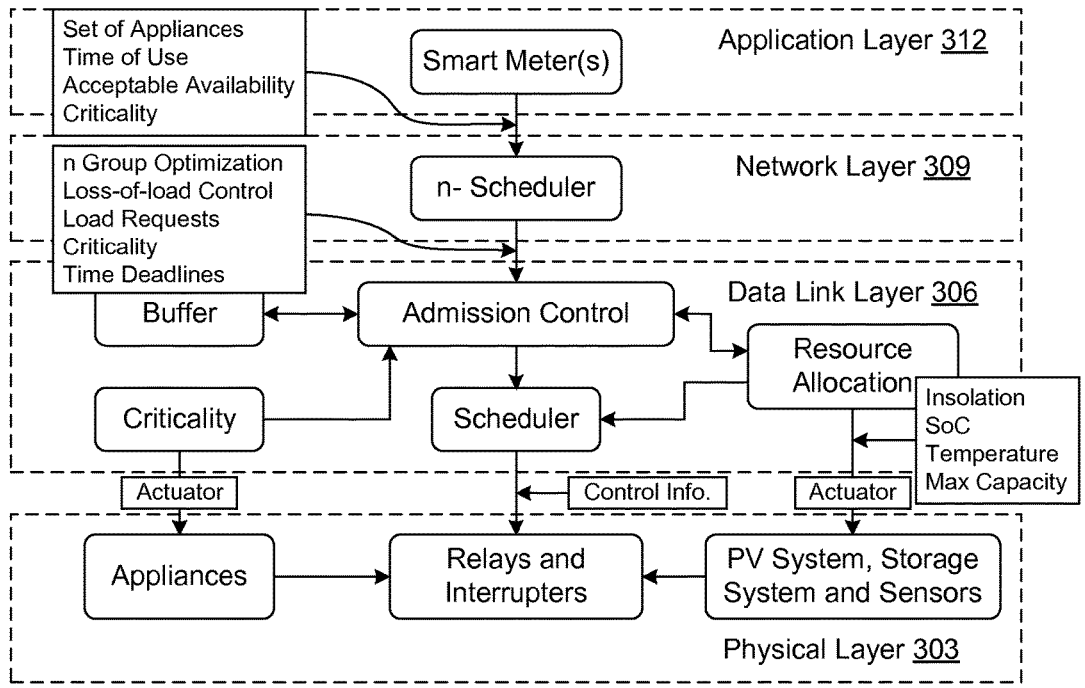

As illustrated in FIG. 3B, the network layer 309 can send information to the data link layer 306 such as, but not limited to, desired loss-of-load probability and load demand characterization. The admission control 324 decides whether the scheduled load should be accepted or rejected, based on the requested (or specified) PQoS, load desired criticality (or availability) 333, the storage system 109 (FIG. 1) state of charge (SoC), and the power generation process of the sustainable resource(s) 103. If the load demand request is accepted by the admission control 324, the resource allocation 327 in the data link layer 306 can reserve resources such as a portion of the storage capacity and/or the power being produced by the sustainable resource 103, such that the specified PQoS guarantees can be satisfied. If load demand request is denied by the admission control 324, the request can be stored in a buffer 321.

Each request stored in the buffer 321 can have a delay tolerance for activation that expires at the end of a possible schedule time, which can be dictated by the end-user. Prior to the expiration of the delay tolerance of the requests in the buffer 321, the admission control 324 decides whether the requests in the buffer 321 should be accepted or rejected according to the system stress imposed by the arrival of the new requests. If a request in the buffer 321 can be admitted, the scheduler 330 can choose among the requests in the buffer 321 with the most critical load being satisfied at that time. If the load demand request is still in the buffer at the end of the delay tolerance, it can be dropped, unless the request is for a load that requires 100% availability or is highly critical, in which case it can be accepted immediately.

Figure 3C:
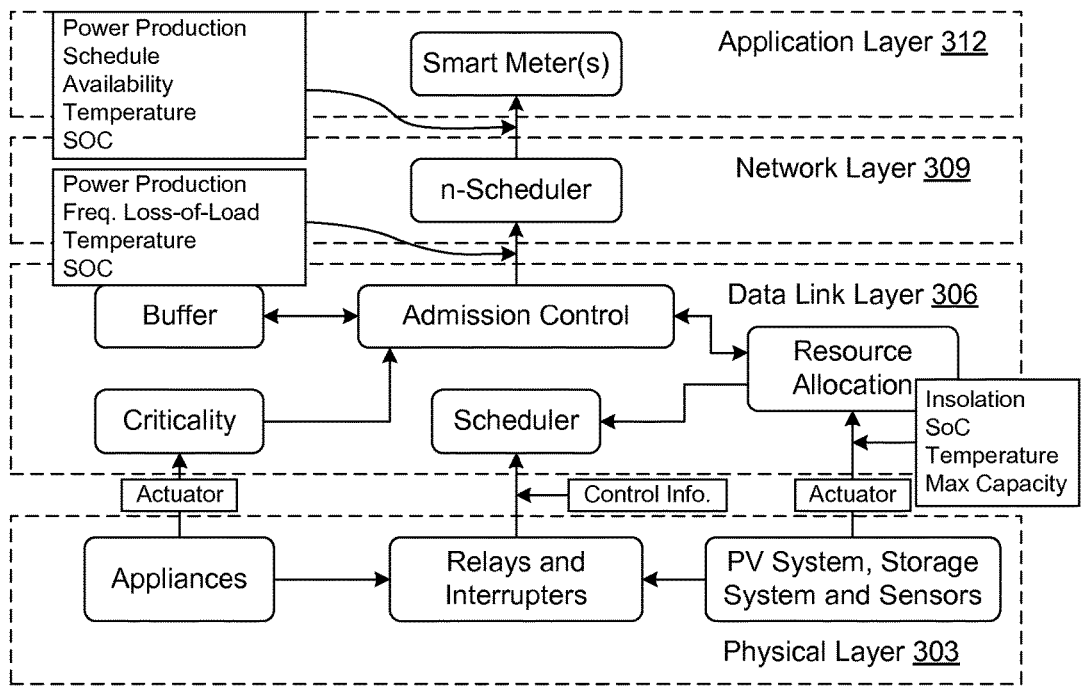

The physical layer 303 includes the hardware components of the microgrid 100 including the sustainable resource(s). It defines the electrical and physical specifications for the hardware. In particular, it defines the relationship between loads 112 and the sustainable resources 103 of the microgrid 100. The physical layer 303 includes the layout of pins, voltages, line impedance, cable specifications, network adapters, relays and interrupters/switches (indicated collectively as 336), load 112 (e.g., appliances 339), photovoltaic (or wind) system 103, energy storage system 109, sensor and more (indicated collectively as 342). The major functions and services performed by the physical layer 303 include establishment and termination of a connection to the sustainable PV-wind resource 103. The interrupters/switches 336 are used to physically disconnect the load such as appliances 339 from the microgrid 100. The sensors are used to convey the state space information of the microgrid 100. FIG. 3C illustrates the components and their basic connection, as well as the information communicated between the various layers 303-312. The communicated information can include, but is not limited to, panel temperature, ambient temperature, insolation, and/or state of charge (SoC) of the storage system 109.

To provide mechanisms that allow for the successful deployment of distributed generation networks or microgrids powered by sustainable energy, the guarantee of continuous availability of power to satisfy the load demand will first be discussed. A fundamental postulate underlying this framework is that the asymptotic production of PV system panel energy (or other source of renewable energy) 103 over a sufficiently long duration converges to the asymptotic energy needed to meet load demand. When power from the renewable energy sources is abundant, the excess power generation can feed the energy storage system 109 (e.g., a battery) until it is fully charged. Whenever there is a deficiency in power, the energy storage system 109 (or battery) can be discharged to cover the load demand until the energy storage 109 is depleted.

The power quality of service (PQoS) of the microgrid 100 can be assessed using the following performance metrics: availability, numbers of hours of storage, loss-of-load probability, and energy waste. Availability refers to the overall uptime probability of the system or the percentage of time in which the microgrid 100 will meet the demand over a certain period. The number of hours of storage can be defined as the time the energy storage system 109 (e.g., battery) can supply power to a stand-alone (islanded) microgrid, which improves system availability. The hours of storage parameter, embodying an energy storage queue, denotes the energy-storage capacity. The loss-of-load probability is the probability of failing to power the load 112, and acknowledges a controllable process between generation and service quality. It can be estimated as the ratio of the energy not served by the 'original' system to the total demanded energy. The energy waste or unutilized energy, known as loss/waste or damped, denotes the amount of energy that is wasted due to a mismatch between the PV system (or other source of renewable energy) 103 and the energy storage system 109.

These metrics can derived as a function of the PV system power production and the storage system capacity. As previously discussed, the PQoS model of FIG. 2B is analogous to a QoS queuing model of FIG. 2A with source traffic 203, network service 206 and a buffer 209. The source traffic 203 can be described as the load model 212; the network service 206 can be described as a PV system (or other sustainable energy system) 215, and the buffer 209 as the energy storage system 218. Since queuing analysis uses traffic and service characterization, the PQoS model can utilize load and PV system as analogous characterizations, which are analogous to the traffic and service characterization.

Figure 4A:
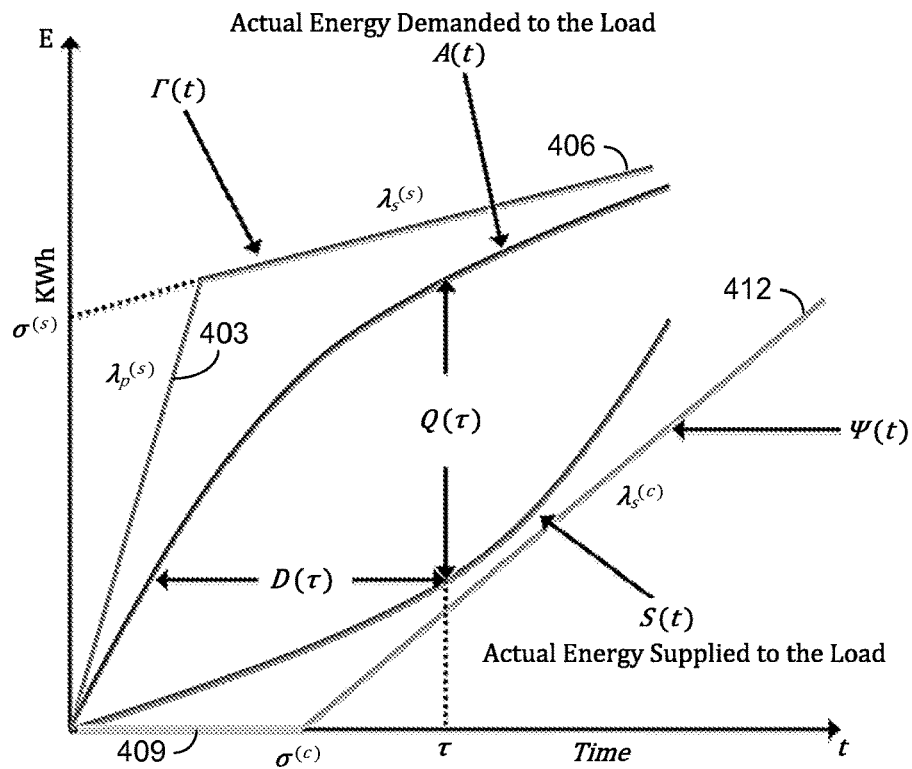
FIGS. 4A and 4B are plots illustrating examples of demand envelope $\Gamma(t)$ and the supply curve $\Psi(t)$ characterization of the microgrid of FIG. 1 in accordance with various embodiments of the present disclosure.

The load 112 can be characterized by the amount of energy (or kWh as a function of time t) demanded by the load and specifying an upper bound for that amount of energy. This upper bound characterization can be expressed as a demand envelope $\Gamma(t)$. The characterization of the sustainable energy system, such as a photovoltaic/wind system, can be a guarantee of a minimum energy supply to satisfy the load. The minimum level is specified by a supply curve $\Psi(t)$. FIG. 4A is a plot of the demand envelope $\Gamma(t)$ and the supply curve $\Psi(t)$, which illustrate the load and PV system characterization.

The load behavior can be characterized by the demand envelope $\Gamma(t)$ as follows. Consider a window of size T, the amount of actual energy demanded by the load A(t) does not exceed $\Gamma(t)$, where $A(t) \leq \Gamma(t)$ for any time t, and the demand envelope satisfies:

$$\Gamma(t) = \min\{\lambda_p^{(s)} t, \lambda_s^{(s)} t + \sigma^{(s)}\} \tag{1}$$

where $\lambda_p^{(s)}$ is maximum surge power demand in watts, $\lambda_s^{(s)}$ is the maximum steady-state power demand in watts, and $\sigma^{(s)}$ is the leaky-bucket size in kWh. The supply curve $\Psi(t)$ indicates lower bounds for the actual energy S(t) supplied to the load by a sustainable energy resource 103 such as the PV system where $\Psi(t) \leq S(t)$ for any time t, and $$\Psi(t) = [\lambda_s^{(c)}(t - \sigma^{(c)})]^+ \tag{2}$$

where $\lambda_s^{(c)}$ is a constant power supply in watts and $\sigma^{(c)}$ is the hours of storage.

In FIG. 4A, the demand envelope Γ(t) and supply curve Ψ(t) each include two segments. For the demand envelope Γ(t), the first segment 403 has a slope equal to the maximum surge power demand $\lambda_p^{(s)}$, and the second segment 406 has a slope equal to the maximum steady-state power demand $\lambda_s^{(s)}$ with $\lambda_s^{(s)} < \lambda_p^{(s)}$. For the supply curve Ψ(t), the first horizontal segment 409 indicates that the PV system (or other sustainable energy resource) 103 (FIG. 1) will not supply any energy to the load 112 (FIG. 1) for a time interval equal to $\sigma^{(c)}$ and the second segment 412 has a slope equal to a constant power $\lambda_s^{(c)}$ supplied by the PV system (or other sustainable energy resource) 103. In addition, the horizontal difference between A(t) and S(t), denoted in FIG. 4A by D(τ), is the time in which the energy being provided to the load 112 is supplied by the energy storage system 109 (FIG. 1), and the vertical difference between the two curves, denoted in FIG. 4A by Q(τ), is the amount of energy drained from the storage system 109.

For the framework of FIG. 4A, Ψ(t) can provide a strict lower bound of the energy supplied by the PV system (or other sustainable energy resource) 103. The supply curve Ψ(t) can be defined stochastically or statistically. The joint pair {Ψ(t),ε} represents the supply curve Ψ(t) for the PQoS, in which ε is the probability that the energy $\tilde{S}(t)$ generated by the PV system (or other sustainable energy resource) 103 will not be able to support the pledged lower bound Ψ(t). The PQoS equation can be described as:

$$sup_t Pr\{\tilde{S}(t) < \Psi(t)\} \le \varepsilon \tag{3}$$

With the load and photovoltaic system characterization, the PV system 103 can be modeled using the theory of effective capacity.

The stochastic behavior of the PV system 103 can be modeled asymptotically by its effective electric generation capacity (EEGC). Let r(t) be the instantaneous power produced by the PV system 103 at time t. The ideal energy generation process provided by the PV system 103 in watt-hours can be written as $\tilde{S}(t) = \int_0^t r(\tau)d\tau$. The parameter $\tilde{S}(t)$ does not account for wasted energy and is therefore different from the actual energy S(t) supplied to the load 112; thus, $\tilde{S}(t)$ only depends on the instantaneous power produced by the PV system 103. It is independent of the actual energy A(t) demanded by the load 112.

Assume that an asymptotic log-moment generating function of a stationary process $\tilde{S}(t)$ is defined as:

$$\Lambda(-u) = \lim_{t \to \infty} \frac{1}{t} \log E\left[e^{-u\tilde{S}(t)}\right] \tag{4}$$

and that it exists for all u≥0. Then, the effective electric generation capacity (EEGC) function of r(t) can be written as:

$$\alpha(u) = \frac{-\Lambda(-u)}{u}, \tag{5}$$
$$\forall u \ge 0$$

or:

$$\alpha(u) = -\lim_{t \to \infty} \frac{1}{ut} \log E\left[e^{-u\int_0^t r(\tau)d\tau}\right], \tag{6}$$
$$\forall u \ge 0.$$

For computational tractability, assume an infinite capacity storage system 109 and a load 112 with a constant power demand of μ. When A(t) is greater than S(t), the amount of energy Q(t) drained from the storage system 109 is non-zero. Using the theory of large deviations, and assuming that $$\lim_{t \to \infty} D(t)$$

is the steady state of Q(t), the probability of $$\lim_{t \to \infty} Q(t)$$

exceeding a threshold B becomes:

$$Pr\left\{\lim_{t \to \infty} Q(t) \ge B\right\} \sim e^{-\theta_B(\mu)B} \text{ as } B \to \infty \tag{7}$$

where f(x)~g(x) means that $\lim_{x \to \infty} f(x)/g(x) = 1$. It is can be shown that for smaller values of B, equation (7) becomes:

$$\lim_{t \to \infty} Pr\{Q(t) \ge B\} \approx \gamma(\mu)e^{-\theta_B(\mu)B} \tag{8}$$

where B is the available capacity of the energy storage system 109 and γ(μ), $\theta_B(\mu)$ are functions of the power demand μ. For a given power demand (μ), $$\gamma(\mu) = Pr\{Q(t) > 0\} \tag{9}$$

which is the probability that the storage system 109 is not fully charged, while the PQoS exponent $\theta_B(\mu)$ is the decay rate of the loss-of-load probability Pr{Q(t)≥B}, which can be defined as:

$$\theta_B(\mu) = \alpha^{-1}(\mu) \tag{10}$$

where, $\alpha^{-1}(\mu)$ is the inverse of the function of α(μ).

Figure 4B:
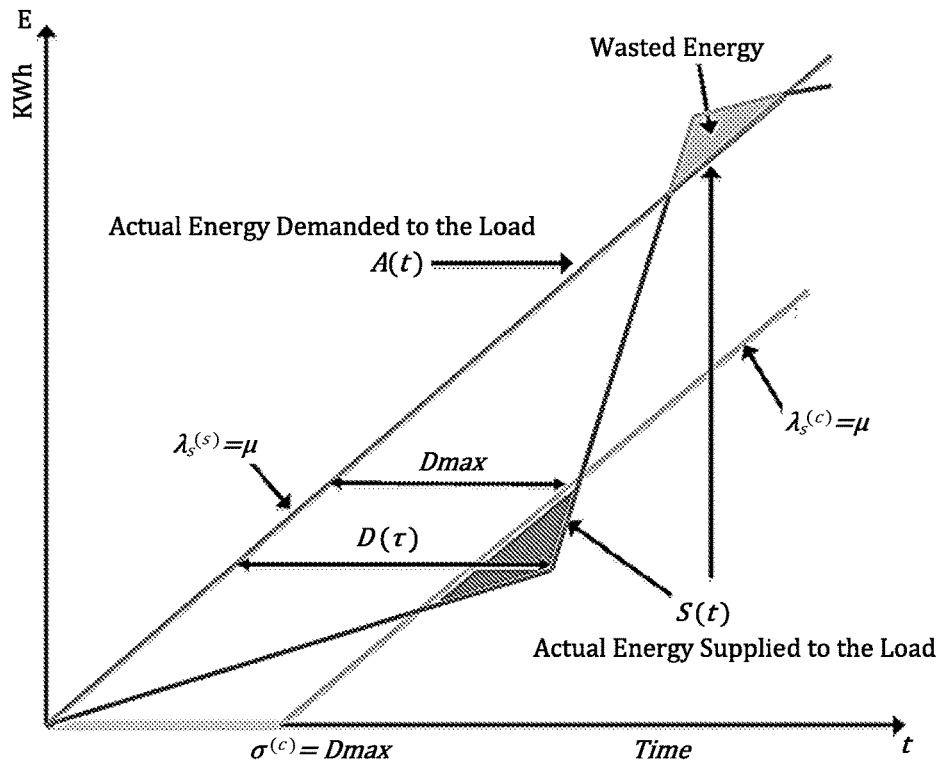

Referring now to FIG. 4B, shown is a plot illustrating the relationship between the power supplied and the loss-of-load. From FIG. 4B, it can be seen that when the energy storage system 109 is fully charged and the energy being produced by the PV system (or other sustainable energy resource) 103 is greater than the energy demanded by the load 112, the extra energy produced ($\tilde{S}(t) - S(t)$) may be lost. Furthermore, it can be seen that the event {D(t)>$D_{max}$} and the event {Ψ(t)>S(t)} are the same. Whenever the actual supplied energy S(t) is below Ψ(t), the horizontal line D(t) will cross the line Ψ(t) and, since the horizontal distance between A(t) and Ψ(t) in FIG. 4B is $D_{max}$, then:

$$\left(\lim_{t \to \infty} Pr\{Q(t) > B\} = \lim_{t \to \infty} Pr\{D(t) > D_{max}\}\right. \tag{11}$$
$$= \left.\lim_{t \to \infty} Pr\{S(t) < \Psi(t)\}\right) < \varepsilon$$

Based on equation (11), then:

$$\lim_{t \to \infty} Pr\{D(t) \ge D_{max}\} \approx \gamma(\mu)e^{-\theta(\mu)D_{max}} \tag{12}$$

where $$D_{max} = \frac{B}{\mu}$$

is the maximum number of hours of storage, and $\theta(\mu)=\mu\theta_B(\mu)$.

From the equations above, it can be concluded that when using a photovoltaic system 103 that has number of hours of storage equal to $D_{max}$, and is modeled by the pair $\{\gamma(\mu), \theta(\mu)\}$, and a load 112 that can tolerate a loss-of-load probability of at most $\varepsilon$, the microgrid limits power demand to a maximum of $\mu$, where $\mu$ is the solution to:

$$\varepsilon = \gamma(\mu)\varepsilon^{-\theta(\mu)D_{max}} \qquad (13)$$

Equations (8), (11) and (12) show that the effective electric generation capacity (EEGC) model can be fully defined by the function pair $\{\gamma(\mu),\theta(\mu)\}$ of the probability that the storage system is not fully charged and the decay rate of the loss-of-load probability. The functions $\gamma(\mu)$ and $\theta(\mu)$ can be estimated from the photovoltaic system measurements taken over a window of size T For example, the functions $\gamma(\mu)$ and $\theta(\mu)$ can be estimated as follows. Assuming that the instantaneous power produced r(t) by the PV system 103 is wide sense stationary and ergodic, and setting $D_{max}=0$, provides:

$$\gamma(\mu) = Pr\{D(\infty) > 0\} \qquad (14)$$

and $$\frac{\gamma(\mu)}{\theta(\mu)} = \frac{E[Q(\infty)]}{\mu}, \qquad (15)$$

which can be rewritten as:

$$\theta(\mu) = \frac{\gamma(\mu) \times \mu}{E[Q(\infty)]}. \qquad (16)$$

From equations (14) and (16), the functions $\gamma(\gamma)$ and $\theta(\mu)$ can be determined by estimating $$Pr\left\{\lim_{t \to \infty} D(t) > 0\right\}$$

and $$E[Q(t)].$$

The estimation of the parameters $$Pr\left\{\lim_{t \to \infty} D(t) > 0\right\}$$

and $$E[Q(t)]$$

can be achieved by taking a number of samples, $N_T$, over an interval (or window) of length T, and then recording S(n), the indicator of whether the energy storage system 109 is fully charged or not ($S(n) \in \{0,1\}$), and Q(n), the amount of energy being drained from the energy storage system 109. The following sample means can then be computed:

$$\hat{\gamma} = \frac{1}{N}\sum_{n=1}^{N} S(n), \qquad (17)$$

$$\hat{q} = \frac{1}{N}\sum_{n=1}^{N} Q(n), \qquad (18)$$

and $$\hat{\theta} = \frac{\hat{\gamma} \times \mu}{q}. \qquad (19)$$

The estimated parameters can be used to predict the loss-of-load probability by approximating:

$$Pr\{D(t) \geq D_{max}\} \approx \hat{\gamma}e^{-\hat{\theta}D_{max}}. \qquad (20)$$

A similar algorithm for estimating effective capacity channel model functions from communication channel measurements is presented in "Providing Quality-of-Service Guarantees in Wireless Networks" by D. Wu (Carnegie Mellon Univ., Pittsburgh, Pa., 2003).

To find a sustaining power demand $\mu$ that will guarantee a certain PQoS for the microgrid 100 with a loss-of-load probability $\varepsilon$ and a maximum number of hours of storage $D_{max}$, equation (13) or (14) is solved for $\mu$. For a fast estimation of the power demand $\mu$, a fast binary search procedure can be used to find $\mu$ that is conservative and within a predefined tolerance. The effective electric generation capacity (EEGC) model can be used to determine and/or set the quality of service guarantees using the pair $\{\gamma(\mu), \theta(\mu)\}$. The EEGC model is valid when

- $\{\gamma(\mu), \theta(\mu)\}$ is the effective electric generation capacity model, which exists if the log-moment generating function $\Lambda(-u)$ exists.
- if r(t) is stationary and ergodic, which enables the estimation of the pair $\{\gamma(\mu), \theta(\mu)\}$.

The use of the EEGC model provides a mechanism that allows for the successful deployment of distributed generation network power by sustainable energy sources that can maintain and provide a guarantee of continuous availability of power to satisfy the load demand. While the guarantee of power is not absolute, the guarantee of power can be optimized to provide power for the greatest amount of time without interruption from a stochastic or random process perspective (maximum likelihood of power availability). As the energy storage capacity increases or the average rated power of the fluctuating PV power resource increases, relative to the load demand, the available likelihood of power for the load increases. In this way, it is possible to maximize the likelihood of availability under any joint configuration of system load, rated power, and energy storage capacity.

Availability—refers to the overall uptime of the system, the percentage of time in which the system will meet the demand over a certain period.

Number of hours of storage—hours of battery storage needed for a stand-alone system to meet the desired system availability. This parameter is correlated with the storage capacity.

The frequency of loss of load—the number of times the load gets interrupted in a specific period of time.

The loss of load probability—is defined as the probability of the failing to power the load. It can be estimated as the ratio of the energy not served by the 'original' system to the total demanded energy.

Energy not utilized or energy loss/waste—the amount of energy that is wasted because of a mismatch between the photovoltaic system and the storage system.

These metrics can be jointly optimized as a function of the PV system power production and storage system capacity.

To examine the veracity of the EEGC model, a simulation of the system in FIG. 2B was carried out over a month. For the sustainable energy system 215, a PV array with a rating of 19.626 kW was used, which produced in average of 64.4 kWh/day in San Antonio. The PV array used a SunPower E20 module. The source of the power demand (load model 212) was a constant load. A microgrid 100 (FIG. 1) that supplies power to a house was simulated. For this simulation, the end-users were the occupants of the house and the loads 112 (FIG. 1) were the appliances in the house. The data for the simulation was generated using Richardson's domestic demand model. This domestic demand model provided information for the occupancy patterns as well as the power demanded by the house.

Figure 5A:
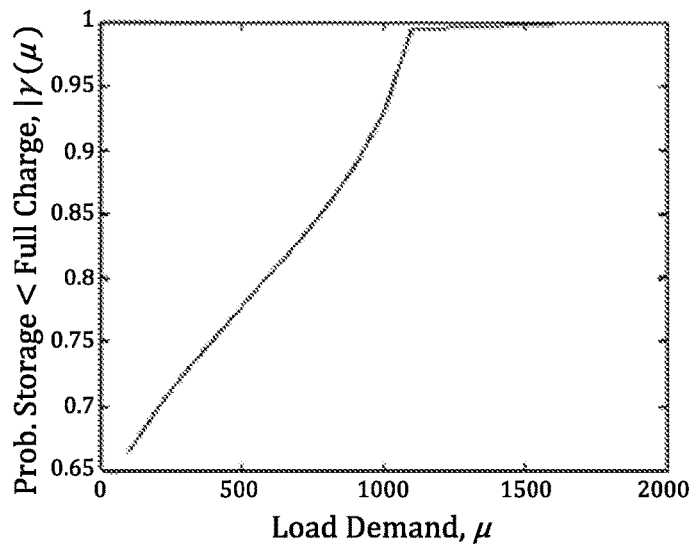
FIGS. 5A through 5F are plots illustrating examples of microgrid operation in accordance with various embodiments of the present disclosure.
Figure 5B:
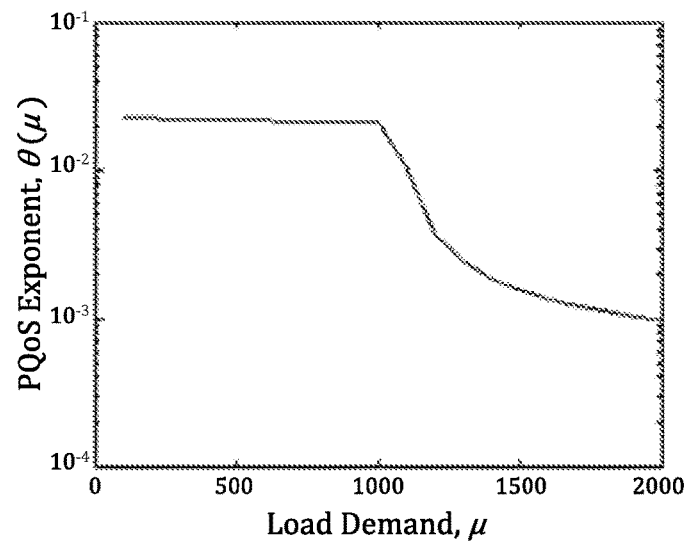
Figure 5C:
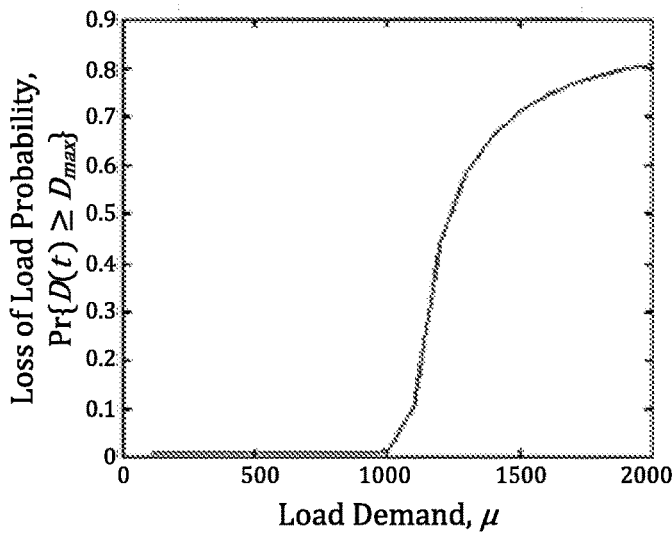

Referring to FIG. 5A, shown is an example of the probability that the energy storage system 109 (FIG. 1) is not fully charged with respect to load demand. The probability that the energy storage system 109 is not fully charged increases as the load demand increases from 100 to 2000 W. Also, as the load increases, the PQoS exponent $\theta(\mu)$ decreases as shown in the plot of FIG. 5B, which indicates a slow exponential decay of the loss-of-load probability. Thus, the loss-of-load probability $\Pr\{D(t) \geq D_{max}\}$ is expected to increase as $\theta(\mu)$ decreases, which was confirmed by FIG. 5C. The plot shows that the loss-of-load probability $\Pr\{D(t) \geq D_{max}\}$ follows an exponential decay.

Figure 5D:
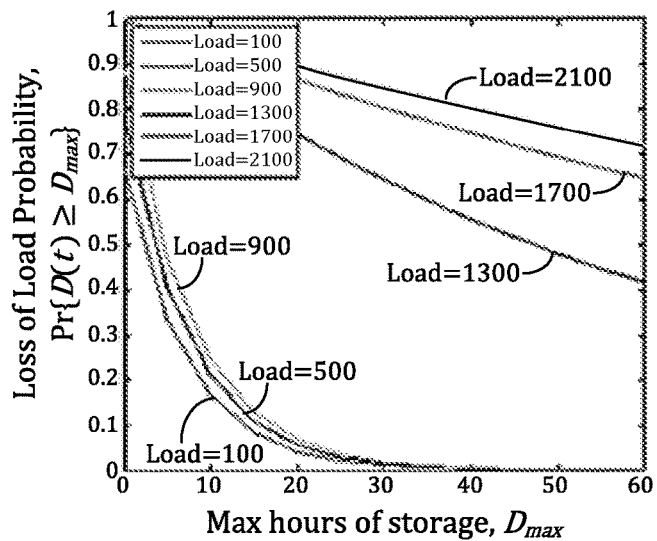

FIG. 5D shows an example of loss-of-load probability with respect to the maximum energy storage in hours. It can be seen from FIG. 5D that, for different load demands, an energy storage system with different capacities is needed. As the load increases, the number of hours of storage to maintain the same loss-of-load probability increases. The frequency of load lost will increase as the load increases. It can also be implied that if the load is kept constant and the plant size decreased, the same behavior will be observed.

Figure 5E:
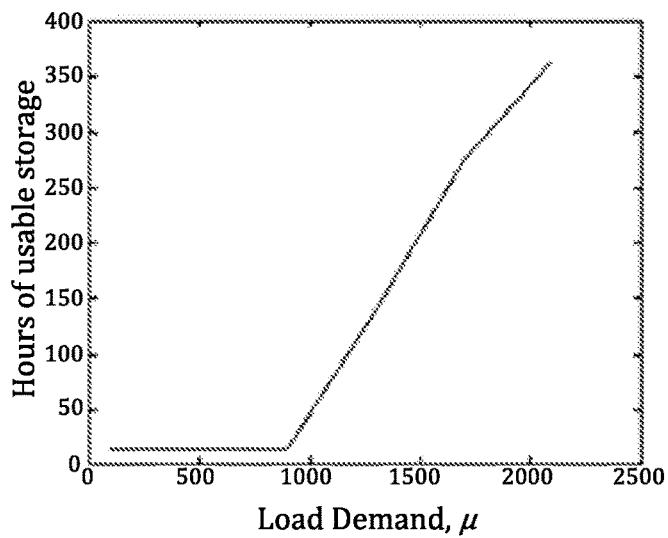
Figure 5F:
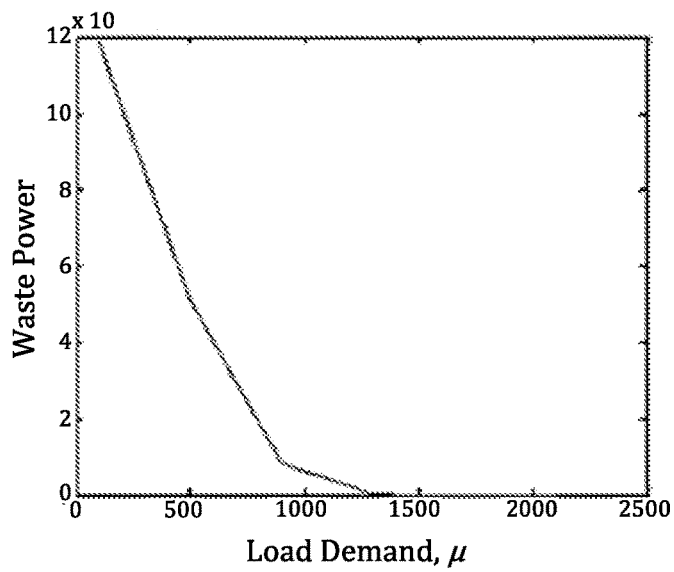

FIG. 5E illustrates the dependence or relationship between the number of hours of storage and the load demand. As the load increases the amount of energy being drained from the energy storage system 109 increases, diminishing the amount of energy that would be lost by a mismatch between the storage system and the PV plant. FIG. 5F shows this relationship more clearly. For all the simulations, it was evident that the loss-of-load probability will be low for small loads less than 1000 W and with 36 hours of storage, and thus non-limiting.

Without loss of generality, the analysis steps are described for PV data. Similar approaches can be applied for wind power or other sustainable energy resource. Data analytics tools can be used to generate a useful model from the dataset without resorting to parametric analysis and the use of subject matter experts. Since the renewable power plant would benefit from predicted values of solar irradiance, the output of the data analytics should be 60 minute predicted values of three irradiance parameters (global horizontal irradiance (GHI), direct horizontal irradiance (DHI), and direct normal irradiance (DNI)). Input variables were down selected from a full data set to only include cloud levels, humidity, temperature, wind speed, and current irradiance levels. Down selection of the data set improves processing time. In other implementations, other numbers of variables can be down selected or down selection may not be carried out on the data set.

Cleanup of the raw data further reduced the data set by removing data points in which GHI, DHI, and DNI levels were very low. This filtering reduces the amount of time and memory needed for analysis. The cleaned data set can be further processed using non-parametric model generating tools such as a fuzzy inference system generator and/or a back-propagation neural network training tool. Fuzzy c-means clustering can be used to cluster values for each variable which produces fuzzy membership functions for each of the variables in the input matrix and output matrix. It can then determine rules to map each of the fuzzy inputs to the outputs to best match the training data set. The neural network training tool can use a back propagation method (e.g., a Levenberg-Marquardt method) to train the network to minimize its mean squared error performance. Differences in the observed and predicted data points generally correspond to the presence of clouds or other anomalies that could not be predicted an hour in advance using the variables input to the function.

The scheduler can be used to efficiently utilize the power being produced by the PV system 103 to reduce and/or avoid waste. While the overall amount of energy consumption will not change, this can be accomplished by shifting around the amount of energy consumption of specific times unit.

For example, with a microgrid 100 with different loads, let $\mathcal{A}$ be the set of loads and for each load $a \in \mathcal{A}$, define an energy consumption scheduling vector:

$$X_a \triangleq [x_a^1, x_a^2, \ldots, x_a^n, \ldots] \qquad (21)$$

where n is a unit of time. For each unit of time n, the scalar $x_a^n$ denotes the corresponding energy consumption that is scheduled for load a. So the total energy consumption for load a is defined as:

$$E_a \triangleq \Sigma_{i=1}^n x_a^i. \qquad (22)$$

Using the energy consumption scheduling vector of each load, the total energy consumption for any unit of time n can also be computed as:

$$l^n \triangleq \Sigma_{a \in A} x_a^n. \qquad (23)$$

By denoting $\alpha_a$ as the beginning and the end $\beta_a$ as the end of a time interval in which the energy consumption for load a can be scheduled. The energy consumption scheduling vector $\chi_a$ will be constrained to:

$$\Sigma_{h=\alpha_a}^{\beta_a} x_a^h = E_a, \forall \alpha_a < \beta_a \qquad (24)$$

with $x_a^i = 0, \forall i \in \{1, \ldots, \alpha_a - 1\} \cup \{\beta_a, \ldots\}$.

An optimization function $f$ can be defined that has the objective of shifting the energy consumption of any load closer to solar noon and to use diversity in concurrent load use, since load concurrence will only occur when there is more than one end-user requiring the same load. The amount of energy usage will not double if the number of end-user doubles; it will just be incremented. The magnitude of the increment can be reduced for each additional end-user added.

First, note that, in general $f^{n_1} \neq f^{n_2}, \forall n_1 \neq n_2$. In other words, the following assumptions concerning the optimization function $f$ can be made:

Assumption 1: the value of the optimization function $f$ can be different at different time units.
Assumption 2: The optimization functions are functions of the solar irradiation.
Assumption 3: The optimization functions depend upon the patterns of the microgrid end-users.

The efficient energy consumption scheduling to be implemented by the network layers (FIGS. 3A-3C) can be characterized as the solution of the following maximization problem:

$$\max\nolimits_{\chi} \Sigma_{i=1}^{n} f^i (\Sigma_{a \in A} x_a^i * I_C(i) * ACC(i)) \quad (25)$$

such that:

$$\Sigma_{n=\alpha_a}^{\beta_a} x_a^n = E_a, \forall a \in A \quad (26)$$

$$x_a^i = 0, \forall i \in \{1, \ldots, \alpha_a - 1\} \cup \{\beta_a + 1, \ldots\} \quad (27)$$

where Acc(n) is the microgrid end-user pattern. Tensor X can be defined by the formation of a stacked energy consumption scheduling vector $X_a$. The optimization problem is linear and can be solved using programming techniques such as the binary integer programming in Matlab.

Figure 6A:
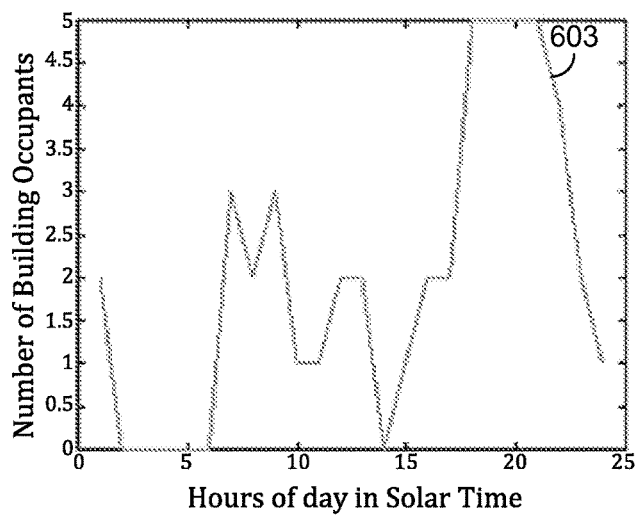
FIGS. 6A and 6B are plots illustrating an example of PQoS optimization for the microgrid of FIG. 1 in accordance with various embodiments of the present disclosure.

Operation of the scheduler was simulated using the microgrid 100 with simulation data generated using the Richardson's domestic demand model. This domestic demand model provided information for the occupancy patterns as well as the power demanded by the house. The results from Richardson's domestic demand model can be seen in FIG. 6A, which shows an hourly occupancy pattern for a household of 5. During bedtime, there are not a lot of active occupants in the house and not asleep. However, occupant activity increases at the break of dawn. As can be seen from curve 603, the evening period is when most occupants are simultaneously active.

Figure 6B:
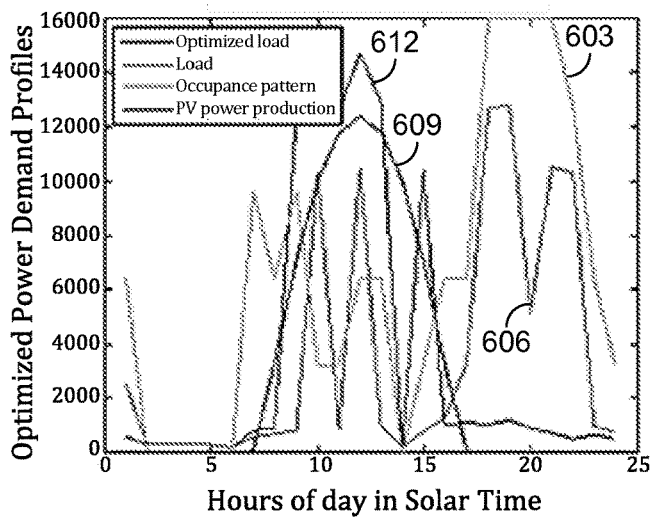

FIG. 6B shows an enhanced illustration of the advantages of shifting the load demand. Curve 606 shows aggregated load demand for the house. We can see that the peak demand coincides with the times when the most occupants are active. Additionally, it can be seen that when the number of active occupants increases from 2 to 5, the consumption of electricity does not double. Curve 609 shows the power being provided to the house by the PV system 103. The power production from the PV system 103 increased to a peak at solar noon before dropping off again. Curve 612 shows an optimized load demand. The peak demand occurs close to the solar noon and coincides with the peak power produced by the PV system 103. When compared with curve 606, one can see the load demand shifting near the solar noon. As peak demand shifts near the solar noon, the stress being imposed on the energy storage system 109 is decreased, also decreasing the loss-of-load probability. Because the peak demand now matches the peak power production by the PV system 103, the amount of energy wasted decreases.

Based on the results, the optimized schedule can reduce the loss-of-load probability, as well as the waste of energy, improving the power quality of service provisioning of the system. By using the a bottom-up approach and regarding the end-users as the occupants of the house and their loads as the appliances in the house, the same decrease in the likelihood of loss-of-load can be observed with a microgrid 100. A sustainable source was modeled by two EEGC functions: the probability that the storage system is not fully charged, and the PQoS exponent of the connection. A PQoS framework was presented for the performance of distributed generation networks powered by sustainable energy sources. Performance metrics for the power system reliability analysis and dimensioning were considered such as, e.g., loss-of-load probability, waste of power supply (WPS) due to mismatch between the energy storage system 109 and the PV system 103, and duration of the loss-of-load. The system can be augmented with an optimized load model and load scheduler.

An example of a power system model was presented for a microgrid including a load, a sustainable energy resource such as a photovoltaic system, and an energy storage system. The model can be described by two functions: the probability that the storage system is not fully charged $\gamma(\mu)$ and the quality of service exponent $\theta(\mu)$ that represents the decay rate of the loss-of-load probability that is used to set the power quality of service guarantees. If $\gamma(\mu)$ and $\theta(\mu)$ can model the power system, then an operational balance can be found between the hours of useful energy storage, the loss-of-load probability and the maximum load allowed by the system.

If a power system has a storage system with $D_{max}$ as the maximum of hours of useful storage capacity, and the system can tolerate a loss-of-load probability not greater than $\epsilon$, then the maximum power demand equals to $\mu$, where $\mu$ is the solution to $\epsilon = \gamma(\mu) e^{-\theta(\mu) D_{max}}$. Using the power system model, the loss-of-load probability can be reduced by increasing the size of the storage system; however, this may increase the energy loss of the microgrid. Furthermore, the frequency of loss-of-load can depend upon the insolation characteristics and the storage system capacity. As the capacity of the storage system increases, the energy loss and the frequency of loss-of-load will decrease by mitigating the instantaneous variation of insolation with the storage system. So, the size of the photovoltaic array and the capacity of the storage system have different effects on the PV system performance indices. A mismatch between the photovoltaic array and storage system may produce loss-of-load at some times and energy loss at other times. In addition, optimized scheduling can reduce the loss-of-load probability as well as the waste of energy improving the power quality of service provisioning of the system.

The network architecture to implement PQoS provisioning for the microgrid was also discussed with respect to FIGS. 3A-3C. The network architecture includes four layers: physical layer 303, data link layer 306, network layer 309 and application layer 312. Each layer provides services to manage the distributed power network or microgrid 100 (FIG. 1). The network architecture can be implemented by processing circuitry of the advanced metering infrastructure (AMI) 118 (FIG. 1). For example, the network architecture can be implemented by a processing device (e.g., a smart meter 315) having processing circuitry including a microprocessor and memory. The smart meter 315 can be part of the AMI 118, which can monitor, coordinate and/or control operation of the microgrid(s) 100 and/or the utility grid 106 (FIG. 1). In some implementations, the network architecture may be implemented by the AMI 118 using a distributed system including one or more remotely located processing devices, which can include a centralized control system and/or smart meters that can communicate with each other. This can facilitate cooperation between the different microgrids for scheduling generation and/or supply of power to the microgrid loads. For example, energy consumption scheduling for the microgrids can be optimized to benefit the overall system.

The application layer 312 can provide an interface for an end-user to provide inputs to and/or receive outputs from the network via a user device 121 (FIG. 1) such as a computer, tablet, smart phone or other suitable processing device. The application layer 312 also provides services for network management. For example, control of a plurality of interconnected microgrids 100 can be provided by the application layer 312 through the AMI 118. The network layer 309 controls the operation of the microgrid 100 and is responsible of creating a schedule for optimized network power consumption and managing the loss-of-load of the microgrid. For instance, the n-scheduler 318 can evaluate the availability of sustainable energy resources 103 (FIG. 1) of the microgrid 100 for scheduling of loads 112 (FIG. 1) to optimize power consumption (e.g., by reducing or eliminating excess load demand and/or energy loss/waste) and avoid loss-of load situations. Loads 112 can be scheduled for use in predetermined time frames to coordinate energy consumption with power generation by the sustainable energy resources 103. For example, non-critical loads can be shifted so that peak demand occurs close to the solar noon and coincides with the peak power produced by a PV system 103. By allowing end-users to specify the times at which the loads can be scheduled, inconvenience to the end-user can be minimized. The n-scheduler 318 can also coordinate operation of a plurality of interconnected microgrids 100 to optimize power consumption by the plurality of microgrids 100 and avoid loss-of load situations in each microgrid 100.

The data link layer 306 provides functional and procedural means for the establishment, maintenance and release of connections between the load 112 (e.g., appliances 339) and the PV system or other sustainable energy resource 103. The physical layer 303 includes the hardware components of the microgrid 100 and facilitates connection/disconnection of various loads 112 from the microgrid 100 by control commands from the data link layer 306. For example, a load demand request can be received from an appliance 339 and passed to the admission control 324 by the load criticality 333, along with availability (or criticality) information for the requesting appliance 339, for evaluation based upon the resource allocation 327 and potential system stress. If the load demand request is accepted by the admission control 324, then the scheduler 330 can configure the relays and interrupters 336 for operation of the appliance 339. If the load demand request is not accepted, then it can be stored in the buffer 321 for later evaluation.

Prior to the expiration of the delay tolerance of the requests in the buffer 321, the admission control 324 decides whether the requests in the buffer 321 should be accepted or rejected according to the system stress imposed by the current resource allocation 327. If a request in the buffer 321 can be admitted, the scheduler 330 can choose among the requests in the buffer 321 with the most critical load being satisfied at that time. If the load demand request is still in the buffer at the end of the delay tolerance, it may be dropped, unless the request is for a load that requires 100% availability or is highly critical. The scheduler 330 can also be used to shift operation of loads 112 with non-emergency (or non-critical) power demands to more suitable times via relays and interrupters 336. The scheduler 330 can coordinate load operations based upon the power production and the end-users schedules. For example, the scheduler 330 can shift load operations closer to solar noon and to use diversity in concurrent appliance use.

In addition, the resource allocation 327 can monitor sensor indications and predict changes in power production by the sustainable energy resources 103 such as a PV system. As previously discussed, neural networks and/or other expert systems can be used to predict power production by PV systems based upon monitored conditions. Based upon the predicted changes, resource allocation 327 can change to avoid stressing the system, and the admission control 324 can evaluate fulfillment of the load demand request accordingly. In some cases, the sensor information may be passed to the n-scheduler 318 in the network layer 309, where it may be used to adjust scheduling of the loads 112 to optimize power consumption and avoid loss-of load. The adjusted scheduling can be passed to the admission control 324 for implementation.

Figure 7:
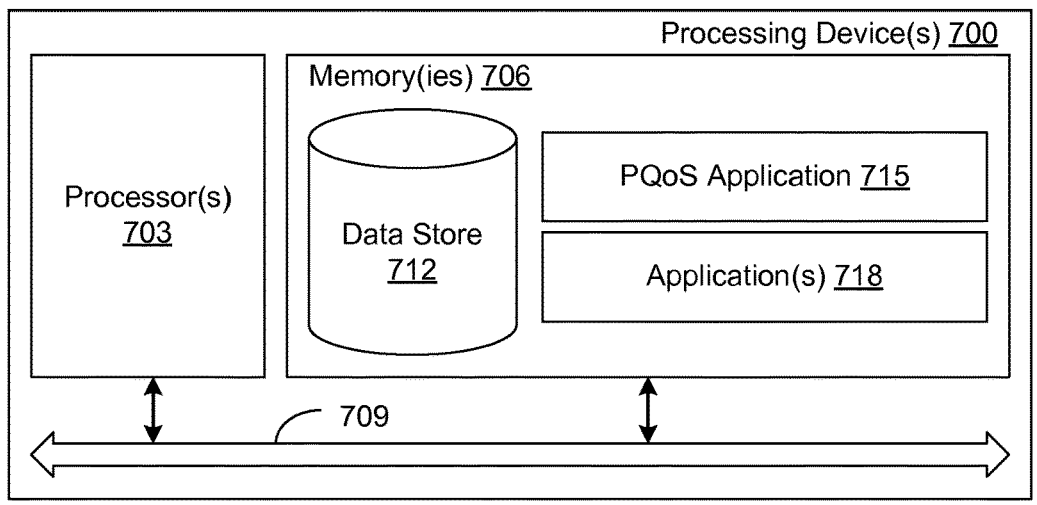
FIG. 7 is a schematic block diagram of a processing device in accordance with various embodiments of the present disclosure.

With reference to FIG. 7, shown is a schematic block diagram of a processing device 700 according to various embodiments of the present disclosure. The processing device 700 (e.g., a smart meter or a centralized control device) includes at least one processor circuit, for example, having a processor 703 and a memory 706, both of which are coupled to a local interface 709. To this end, the processing device 700 can comprise, for example, at least one computer or like device, which may be used to control radar transmissions. The local interface 709 can comprise, for example, a data bus with an accompanying address/control bus or other bus structure as can be appreciated.

Stored in the memory 706 are both data and several components that are executable by the processor 703. In particular, stored in the memory 706 and executable by the processor 703 may be a PQoS application 715 and/or other applications 718. The PQoS application 715 can implement some or all of the network architecture that has been described with respect to FIGS. 3A-3C. Also stored in the memory 706 can be a data store 712 and other data. In addition, an operating system can be stored in the memory 706 and executable by the processor 703.

It is understood that there can be other applications that are stored in the memory 706 and are executable by the processor 703 as can be appreciated. Where any component discussed herein is implemented in the form of software, any one of a number of programming languages can be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 706 and are executable by the processor 703. In this respect, the term "executable" means a program file that is in a form that can ultimately be run by the processor 703. Examples of executable programs can be, for example, a compiled program that can be translated into machine code in a format that can be loaded into a random access portion of the memory 706 and run by the processor 703, source code that can be expressed in proper format such as object code that is capable of being loaded into a random access portion of the memory 706 and executed by the processor 703, or source code that can be interpreted by another executable program to generate instructions in a random access portion of the memory 706 to be executed by the processor 703, etc. An executable program can be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 can comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM can comprise, for example, static random access memory (SRAM), dynamic random access memory (DRAM), or magnetic random access memory (MRAM) and other such devices. The ROM can comprise, for example, a programmable read-only memory (PROM), an erasable programmable read-only memory (EPROM), an electrically erasable programmable read-only memory (EEPROM), or other like memory device.

Also, the processor 703 can represent multiple processors 703 and the memory 706 can represent multiple memories 706 that operate in parallel processing circuits, respectively. In such a case, the local interface 709 can be an appropriate network that facilitates communication between any two of the multiple processors 703, between any processor 703 and any of the memories 706, or between any two of the memories 706, etc. The local interface 709 can comprise additional systems designed to coordinate this communication, including, for example, performing load balancing. The processor 703 can be of electrical or of some other available construction.

Although the PQoS application 715, application(s) 718, and other various systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

Also, any logic or application described herein, including the PQoS application 715 and/or application(s) 718, that comprises software or code can be embodied in any non-transitory computer-readable medium for use by or in connection with an instruction execution system such as, for example, a processor 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including, for example, static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

A system and method for a quality of service electric generation capacity and stochastic optimization technology for microgrids has been presented. The network architecture for power quality of service provisioning for microgrids using the PQoS model and adaptive scheduling to shift the load demand has been discussed. The network architecture can enable microgrids to provide 100% of demanded power with some probability of commitment.

Uninterrupted power generation from sustainable resource(s) can be achieved using the minimum power rated PV, Wind, and energy storage components. For instance, by setting the quality of service parameter at 99.99%, probabilistic guarantees in the design availability of microgrid power may be provided for yearly continual operation, where continuous operation is defined by an expected downtime of 53 minutes per year (0.01% minutes). Uninterrupted was characterized using a Power Quality of Service (PQoS). If the PQoS is set for r %, then 1−r % power availability probability (e.g. r=1%, implies 99%, availability of power.) may be ensured.

In some embodiments, the joint combination of PV, Wind, Energy Storage, and Load can be optimally utilized, where optimization can be achieved by shifting loads and applying energy storage protocols that maximize the availability of power.

A renewable energy power plant that manages loads, energy storage protocols and rated capacities of renewable power and energy storage, can ensure a PQoS equal to and/or greater than the value specified by the end-user. The PQoS parameter enables the power generation to be detached from the main grid in a microrid islanded mode or to scale to very large utility scale and to attach the main grid as a large renewable energy power plant.

In some embodiments, the user of the system may specify any two of three parameters selected from the following set: rated load demand, power quality of service, energy storage capacity. From this, the system can calculate the value of the third parameter to meet the indicated PQoS.

A PQoS for a sustainable resource system network that is entirely or partially isolated from the main power grid may be directly or indirectly determined. Load diversity can be used to maximize the availability of power. New loads admitted by the system can have their requested PQoS satisfied without violating the PQoS guarantees made to existing loads in the system.

PV and wind power fluctuates randomly. Prior systems either oversized some combination of PV, wind, and energy storage, thereby producing additional unused power with a high probability of occurrence. This increased the cost of prior systems. Both random fluctuations in power generation and in load demand can be accounted for.

Providing reliability of service is an important factor for the electrical grid network. The electrical grid network is typically designed to provide 100% availability of power from large power plant facilities. A microgrid scenario exists where power generation occurs from smaller, distributed power sources. However, microgrids, especially ones using renewable energy sources as their primary energy resource, may introduce random fluctuations in the power generation process because the power produced by them varies randomly with time of the year, shading, temperature, and location. A PQoS model, which is a derivation of the queuing behavior analysis quality of service model used in the next-generation of wireless networks, was presented. The PQoS model enables design of the availability of power provisioning mechanisms, such that when implemented, can be used to optimize microgrids for availability of power guarantees.

In some embodiments, the microgrid includes a network architecture. In various embodiments, the microgrid includes a power storage system that has the ability to independently specify the energy and power ratings. In some implementations, the storage system can utilize Vanadium redox flow battery (VRB) technology. VRB technology can be seen as an unlimited energy capacity through use of larger and larger storage tanks.

In some embodiments, the microgrid structure incorporates use of a three-port inverter. In this three-port inverter embodiment, a first port attaches to the load, second port attaches to the energy storage system, and the third port attaches to the sustainable energy resource. Furthermore, the third (renewable energy port) can directly charge the energy storage system and the energy storage system can transfer some or all of its rated power to the load.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A microgrid, comprising:
a plurality of loads;
a sustainable energy resource configured to provide electric power to the plurality of loads;
an energy storage system configured to provide stored electric power to the plurality of loads when generation capability of the sustainable energy resource is exceeded by load demand of the plurality of loads; and
a smart meter configured to control supply of electric power to the plurality of loads based at least in part upon energy consumption scheduling of the plurality of loads, where the energy consumption scheduling is based at least in part upon an effective electric generation capacity (EEGC) of the sustainable energy resource and the energy storage system, and the smart meter is configured to initiate provision of electric power to a load of the plurality of loads in response to acceptance of a load demand request based at least in part upon the energy consumption scheduling and to store unaccepted load demand requests for reconsideration prior to expiration of a predefined delay tolerance.

2. The microgrid of claim 1, wherein the energy consumption scheduling comprises a defined schedule of enemy consumption for individual loads of the plurality of loads over a series of predetermined time frames, and is based at least in part upon estimated power output of the sustainable energy resource and a load demand characterization of the plurality of loads.

3. The microgrid of claim 2, wherein the load demand characterization is associated with an occupancy pattern of a building.

4. The microgrid of claim 2, wherein the sustainable energy resource comprises a photovoltaic system, and the estimated power output is based at least in part upon local insolation and photovoltaic array characteristics.

5. The microgrid of claim 1, wherein the energy consumption scheduling shifts at least a portion of the load demand of the plurality of loads toward a power production peak of the sustainable energy resource.

6. The microgrid of claim 1, wherein the acceptance of the load demand request is further based upon resource allocation of the microgrid and a state of charge of the energy storage system.

7. The microgrid of claim 1, wherein the acceptance of the load demand request is further based upon load criticality corresponding to the load demand request.

8. The microgrid of claim 1, wherein the smart meter is configured to initiate disconnection of a load of the plurality of loads from the microgrid when the load is not being used or to avoid failure of the microgrid.

9. The microgrid of claim 1, wherein the microgrid is operating in an islanded mode.

10. A system, comprising:
a plurality of interconnected microgrids, individual microgrids of the plurality of interconnected microgrids comprising:
a plurality of loads;
a sustainable energy resource;
an energy storage system; and
a smart meter; and
an advanced metering infrastructure (AMI) configured to monitor operations of the plurality of interconnected microgrids and to control supply of electric power from the sustainable energy resource and the energy storage system of the individual microgrids to the plurality of loads of the individual microgrids via the smart meters of the individual microgrids based at least in part upon energy consumption scheduling of the plurality of loads of the individual microgrids, where the energy consumption scheduling comprises a defined schedule of energy consumption for individual loads of the plurality of loads of the individual microgrids over a series of predetermined time frames, and the energy consumption scheduling is based at least in part upon an effective electric generation capacity (EEGC) of the sustainable energy resource and the energy storage system of the individual microgrids.

11. The system of claim 10, wherein a portion of the electric power from the sustainable energy resource and the energy storage system of a first individual microgrid is supplied to the plurality of loads of a second individual microgrid.

12. The system of claim 10, wherein a portion of the electric power supplied to the plurality of loads of a first individual microgrid of the plurality of interconnected microgrids is provided by a second microgrid of the plurality of interconnected microgrids.

13. The system of claim 12, wherein another portion of the electric power supplied to the plurality of loads of the first individual microgrid is provided by a utility grid.

14. The system of claim 12, wherein another portion of the electric power supplied to the plurality of loads of the first individual microgrid is provided by a centralized energy storage system not included in the individual microgrids.

15. The system of claim 10, wherein the energy consumption scheduling is based at least in part upon estimated power output of the sustainable energy resource of the individual microgrids and a load demand characterization of the plurality of loads of the individual microgrids.

16. The system of claim 10, wherein the smart meter of a first individual microgrid is configured to initiate provision of electric power to a load of the plurality of loads of the first individual microgrid in response to acceptance of a load demand request for the load, the acceptance of the load demand request based at least in part upon the energy consumption scheduling.

17. The system of claim 16, wherein the acceptance of the load demand request is further based upon resource allocation of the microgrid of the first individual microgrid and a state of charge of the energy storage system of the first individual microgrid.

18. The system of claim 16, wherein the energy consumption scheduling is based upon an effective electric generation capacity (EEGC) of the sustainable energy resource and the energy storage system of a second microgrid of the plurality of microgrids.

19. The system of claim 16, wherein the smart meter of the first individual microgrid is configured to store unaccepted load demand requests for reconsideration prior to expiration of a predefined delay tolerance.

20. The system of claim 10, wherein the smart meter of a first microgrid of the plurality of interconnected microgrids communicates with the smart meter of a second microgrid of the plurality of interconnected microgrids to coordinate creation of the energy consumption scheduling of the plurality of loads of the individual microgrids.

21. The system of claim 20, wherein the smart meters of the first and second microgrids communicates with a centralized control system to coordinate the creation of the energy consumption scheduling.

22. The system of claim 10, wherein one or more of the smart meters of the individual microgrids are configured to initiate provision of electric power to a load of the plurality of loads in response to acceptance of a load demand request based at least in part upon the energy consumption scheduling, and to store unaccepted load demand requests for reconsideration prior to expiration of a predefined delay tolerance.

23. A smart meter of a microgrid including a sustainable enemy resource and an enemy storage system, the smart meter comprising:
    an admission control configured to accept a load demand request based at least in part upon resource allocation of the microgrid, the load demand request corresponding to a load of the microgrid;
    a scheduler configured to initiate provision of electrical power to the load from the sustainable enemy resource or the enemy storage system in response to acceptance of the load demand request; and
    a buffer configured to store unaccepted load demand requests for reconsideration by the admission control prior to expiration of a predefined delay tolerance.

24. The smart meter of claim 23, wherein the scheduler is configured to initiate provision of electrical power in response to acceptance of an unaccepted load demand request based upon criticality of a load corresponding to the unaccepted load demand request.

25. The smart meter of claim 23, wherein acceptance of the load demand request is further based upon energy consumption scheduling of the load corresponding to the load demand request.

* * * * *